J. R. MOFFATT.
SEWING MACHINE.
APPLICATION FILED JAN. 29, 1910.
1,172,162.
Patented Feb. 15, 1916.
9 SHEETS—SHEET 7.
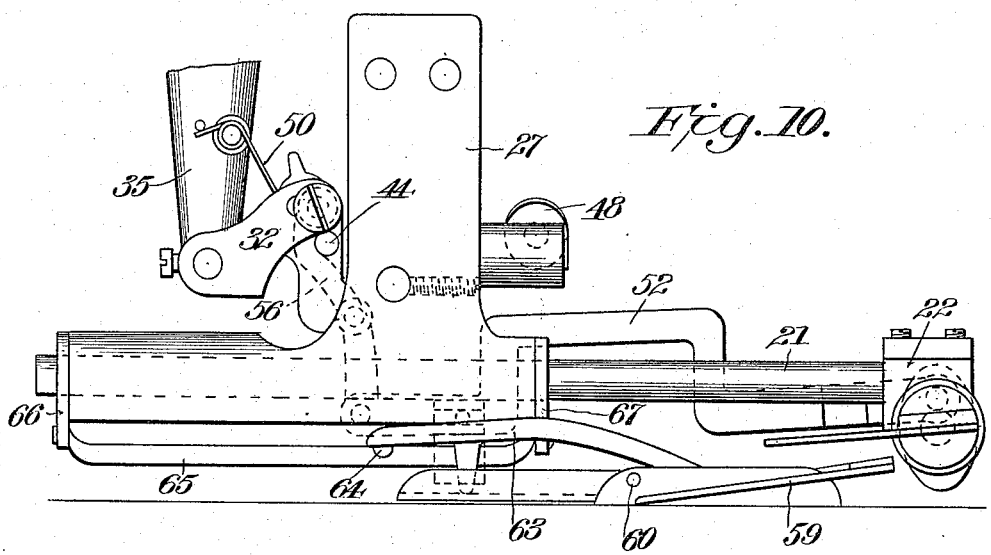
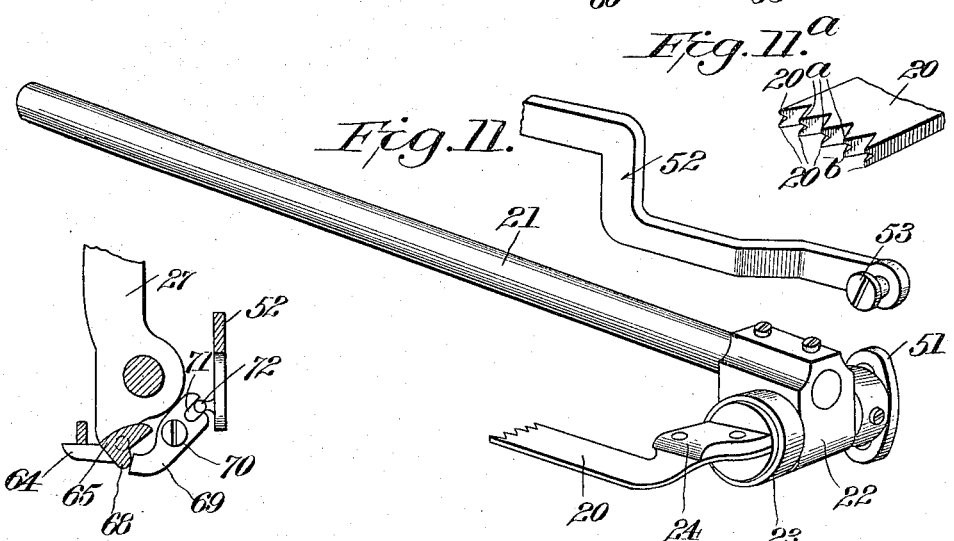
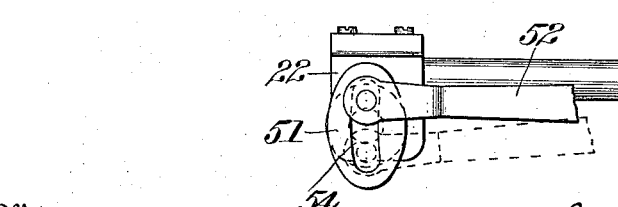

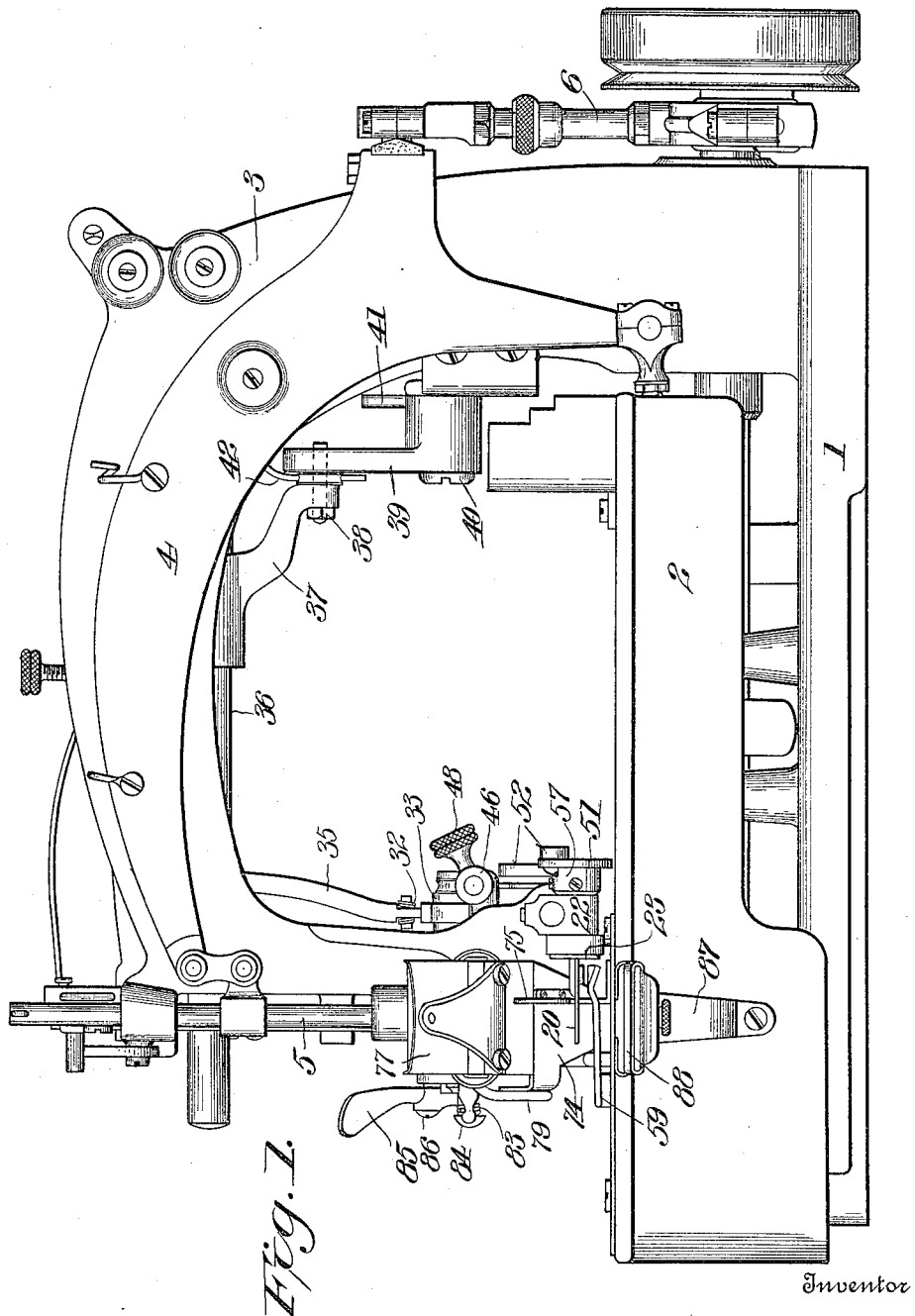

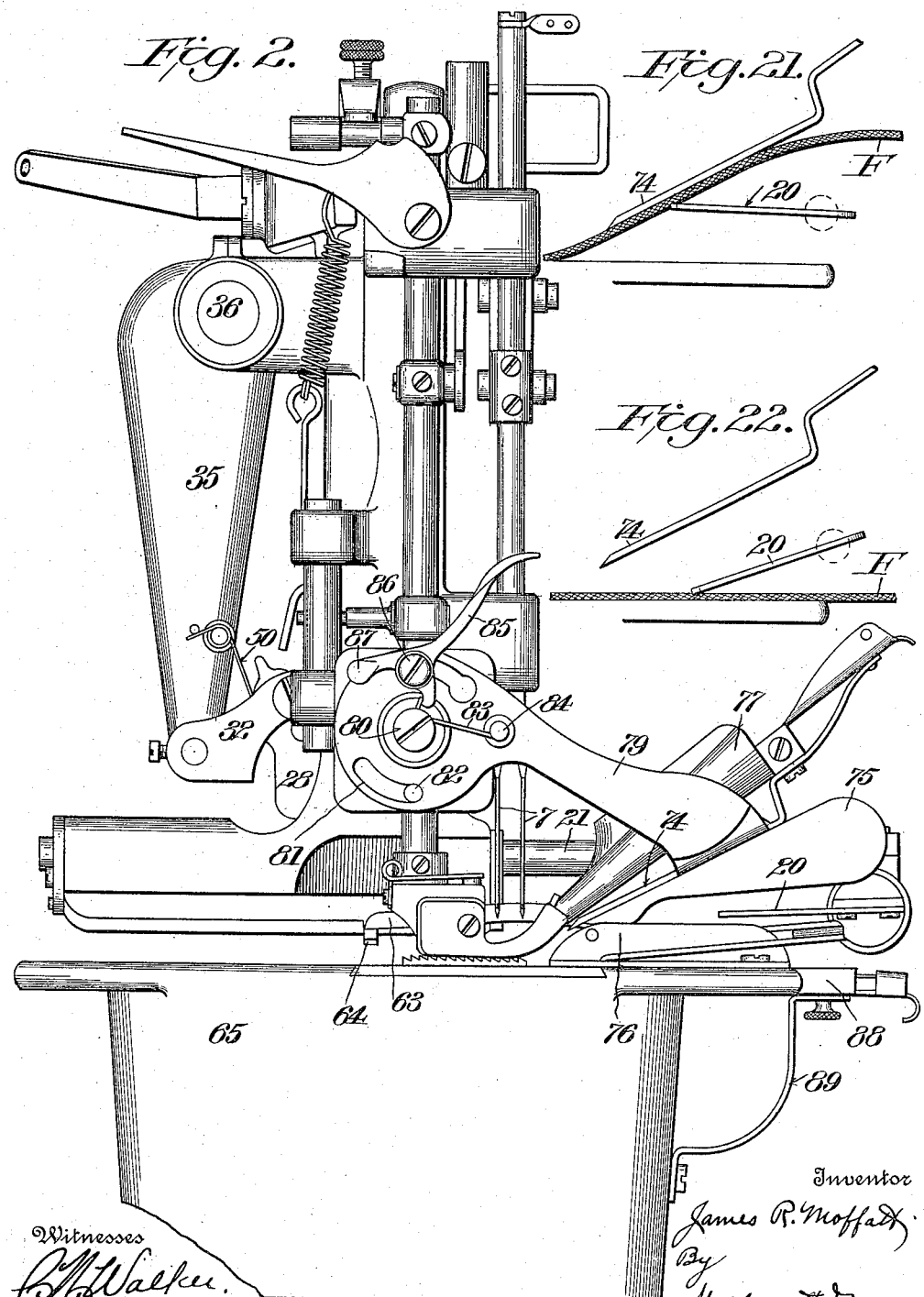

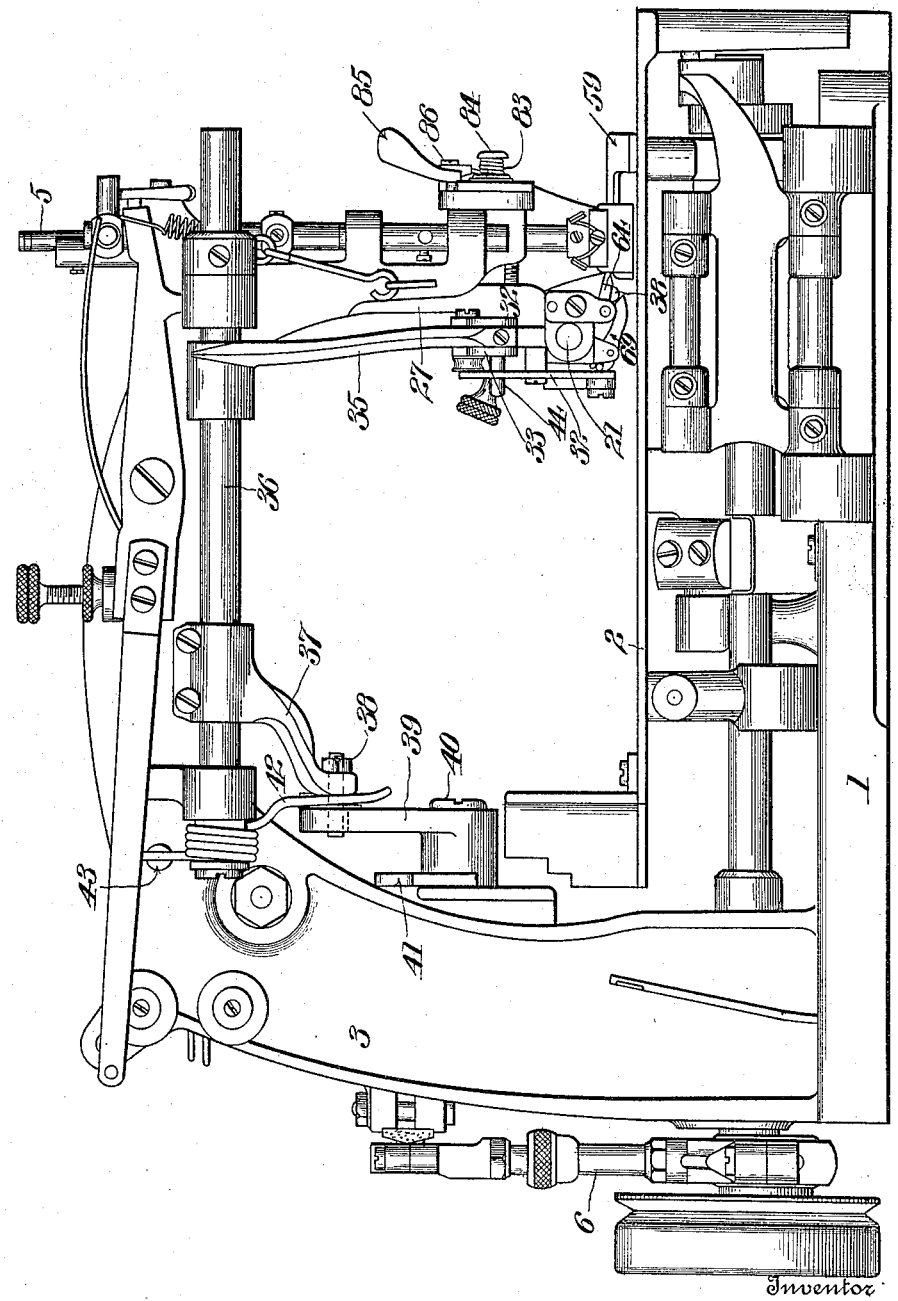

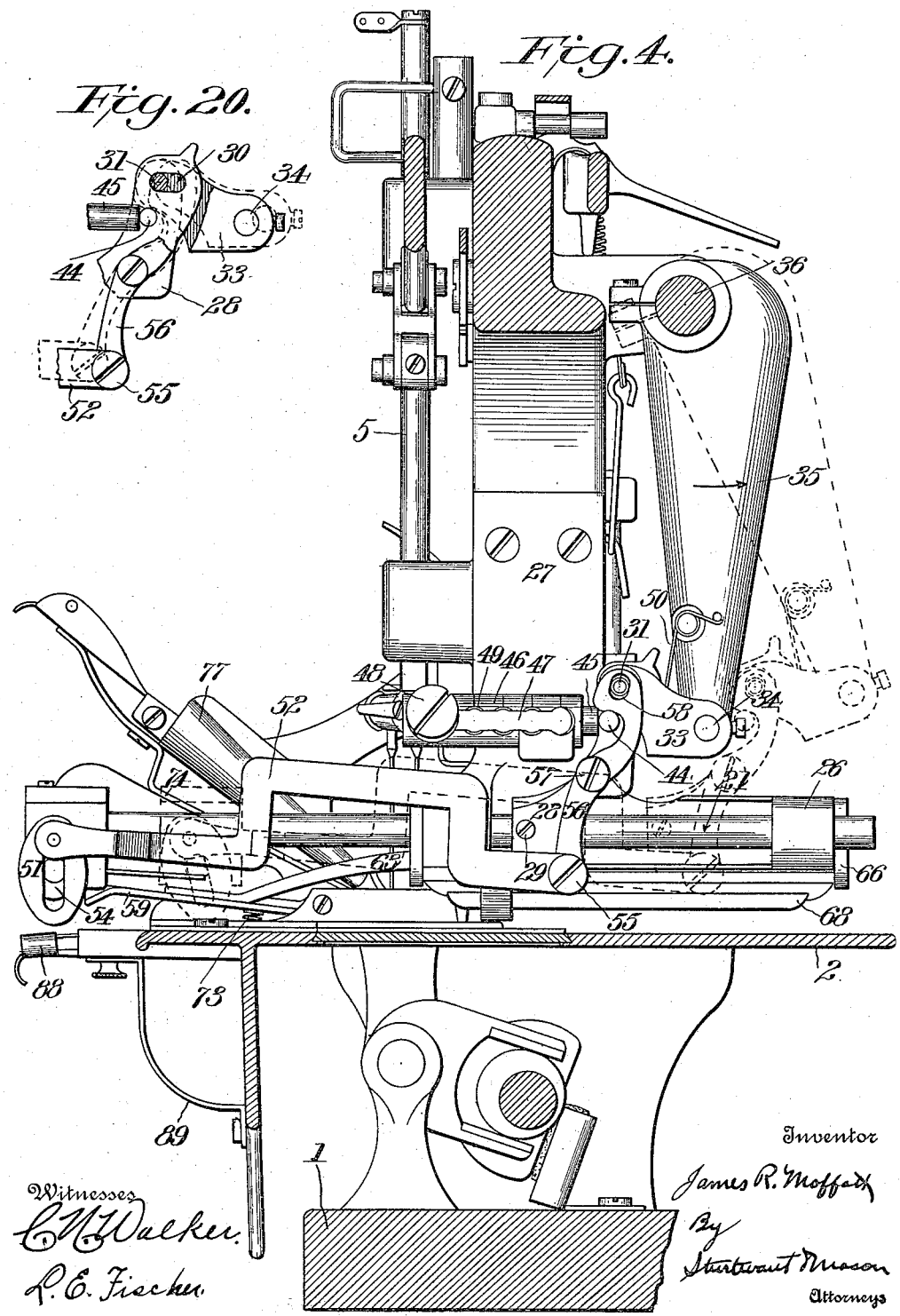

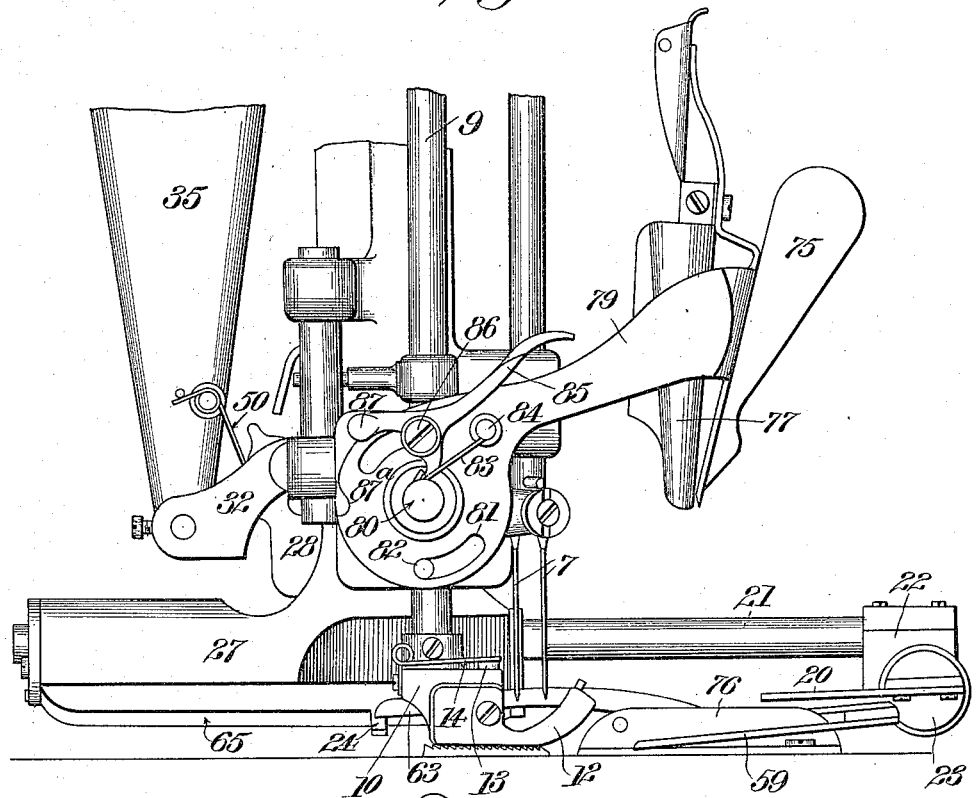
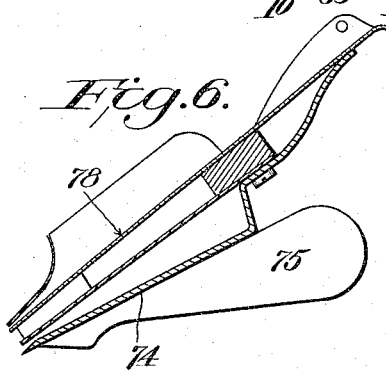
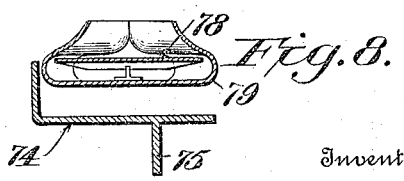

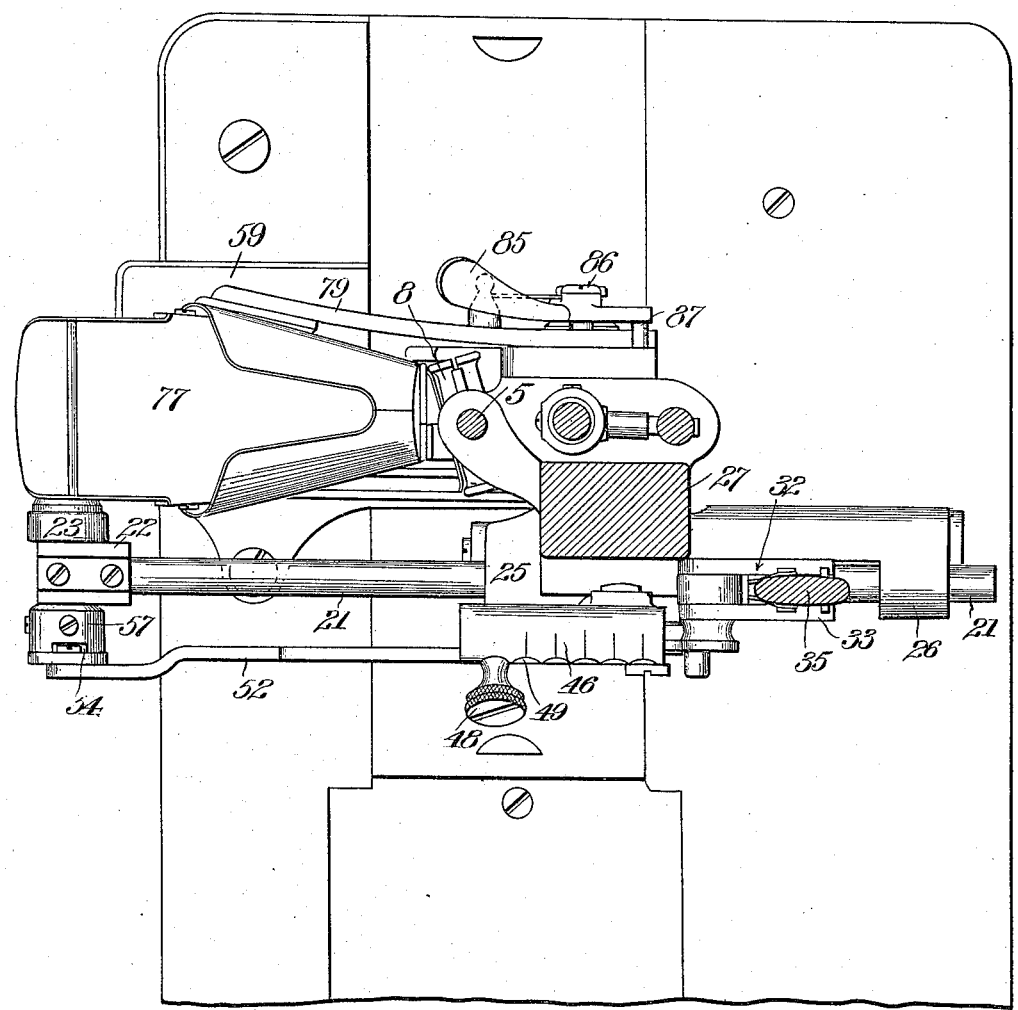

J. R. MOFFATT.
SEWING MACHINE.
APPLICATION FILED JAN. 29, 1910.
1,172,162.
Patented Feb. 15, 1916.
9 SHEETS—SHEET 8.
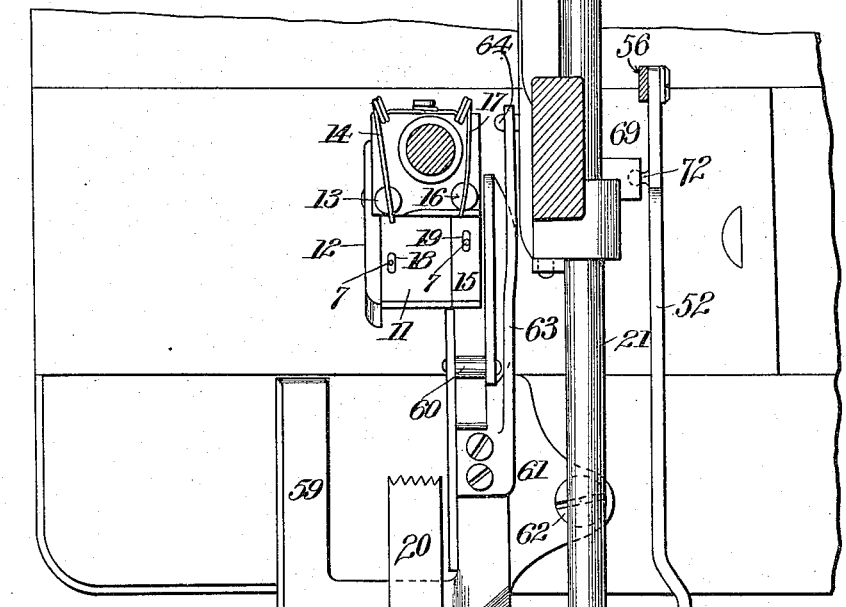
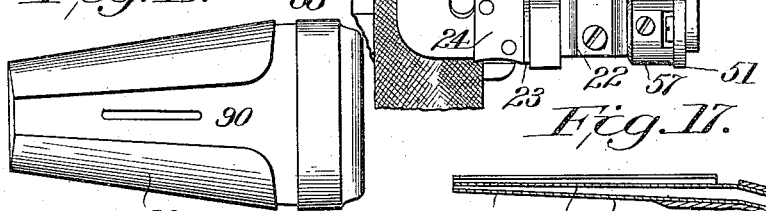
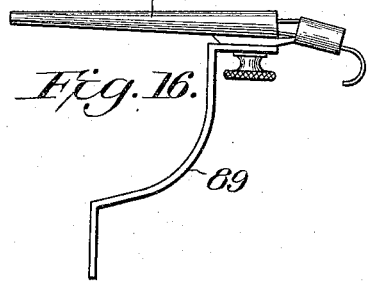

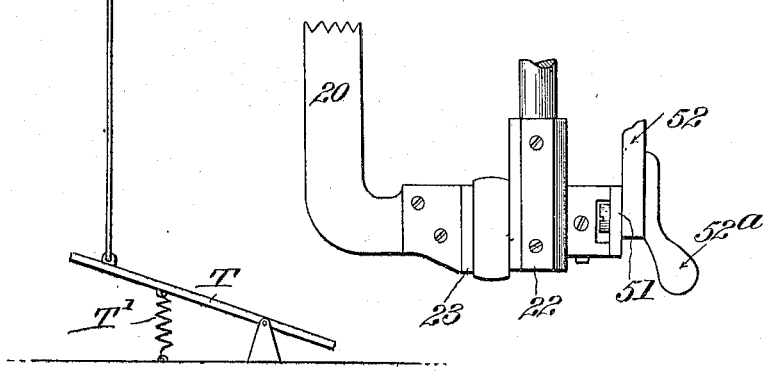

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

SEWING-MACHINE.

1,172,162.        Specification of Letters Patent.        Patented Feb. 15, 1916.

Application filed January 29, 1910. Serial No. 540,879.

*To all whom it may concern:*

Be it known that I, JAMES R. MOFFATT, a citizen of the United States, residing at Chicago, in the county of Cook, State of Illinois, have invented certain new and useful Improvements in Sewing-Machines, of which the following is a description, reference being had to the accompanying drawing, and to the letters and figures of reference marked thereon.

The invention relates to new and useful improvements in sewing machines, and has for an object to provide a sewing machine with mechanism whereby a single plait may be formed in a fabric being stitched.

A further object of the invention, is to provide a sewing machine with mechanism whereby a single reversed plait may be formed.

A further object of the invention is to provide a sewing machine with mechanism capable of being operated at the will of the operator, for forming a plait.

A further object of the invention is to provide a sewing machine with a plait forming member which may be manually operated to form either a single plait or a reverse plait.

My improved plait forming mechanism may obviously be used for forming plaits in garments of any desired character, although it is more especially designed for use in forming the bottom portions of boys' knicker-bocker trousers.

A further object of the invention, resides therefore, in providing a plaiting machine of the above character with means for guiding and folding an outer band for the bottom portion of the trouser leg, which band is stitched to the leg of the trouser, after the plaits have been formed therein.

A further object of the invention is to provide a plait forming mechanism of the above character with a folding device for folding and guiding an inner band which is stitched to the bottom portion of the trouser leg, after the plaits are formed therein, so as to finish the trouser leg, and secure the plaits in position.

These and other objects will in part be obvious, and will in part be hereinafter more fully described.

In the drawings which show by way of illustration one embodiment of the invention; Figure 1 is a front view of a sewing machine, showing my improved mechanism applied thereto. Fig. 2 is an end view of the same. Fig. 3 is a view from the rear of the machine. Fig. 4 is a sectional view through the machine, at a point adjacent the needle head and showing the mechanism for operating the plaiting blade. Fig. 5 is a view from the end of the machine, showing the upper folder raised to inoperative position. Fig. 6 is a sectional view through the upper folder. Fig. 7 is a view of the delivery end of the folder. Fig. 8 is a view of the receiving end of the upper folder in section. Fig. 9 is a plan view partly in section, showing the position of the folder relative to the stitching mechanism, and a portion of the mechanism for operating the plait forming blade. Fig. 10 shows mechanism for operating the plait forming blade and the supporting bracket therefor. Fig. 11 is a detached perspective view of the plait forming blade, its supporting member and the tilting link. Fig. 11ª is an end view of the blade. Fig. 12 is a detail partly in section showing the mechanism for shifting the link so as to reverse the tilting of the plaiting member. Fig. 13 is a detail showing the connection between the reversing link and the member for supporting the plaiting blade. Fig. 14 is a plan view showing the plait operating mechanism, the reversing mechanism, and the relation of the same to the presser foot. Fig. 15 is a detail of the lower folding member. Fig. 16 is a side view of the same, showing the supporting bracket. Fig. 17 is a longitudinal sectional view through the folder. Fig. 18 is a transverse section near the receiving end. Fig. 19 is a transverse section at the delivery end. Fig. 20 is a detail showing the connection between the operating rock shaft and the support for the plaiting blade and also the connection between the rock shaft and the reversing link. Fig. 21 is a diagrammatic view showing the plaiting blade operating on the under side of the fabric. Fig. 22 is a similar view showing the plaiting blade operating upon the upper face of the fabric. Fig. 23 shows the fabric formed into a reverse plait and the position of the plaiting blade for each fold in the fabric. Fig. 24 is a section through the supporting head for the plaiting blade.

Fig. 25 is a section on line A—A', Fig. 24.
Fig. 26 is a section on line B—B, Fig. 24.
Fig. 27 is a plan view of the head for the plaiting blade showing the finger piece attached. Fig. 28 is a view showing more or less diagrammatically the actuating lever in side elevation and a controlling treadle therefor.

In the drawings, the sewing machine shown is of the usual construction and consists of a bed plate 1, a work support 2, an overhanging arm 3 to which is pivoted a needle lever 4, reciprocating a needle bar mounted in the needle head carried at the forward end of the overhanging arm. Said needle lever 4 receives its oscillation through the usual link connection 6, with the driving shaft. The needle bar 5 as herein shown, is provided with two needles 7, 7, which are preferably carried by a head 8 (see Fig. 9), which is inclined to the line of feed. Any suitable complemental stitch forming mechanism may be provided and as the same forms no part of the present invention, further description thereof is not thought to be necessary.

A presser bar 9 of the usual character, is mounted in the head of the machine and carries a presser foot 10 at its lower end. Said presser foot 10 consists of a main part 11, (see Fig. 14), which is preferably pivoted to its supporting shank so that it may rock up and down when desired.

An auxiliary portion 12 is pivotally carried by a vertically sliding post 13, held spring pressed downward against the material by a spring 14. A second auxiliary portion 15 is secured to a post 16, held spring pressed downward by a spring 17. The main portion 11 is provided with a needle slot 18 and the auxiliary portion 15 is provided with a needle slot 19.

The plait forming member 20 as herein shown, is in the form of a blade, and is adapted to engage the under face of the fabric when the fabric is passed over said blade, as shown in Fig. 21, so as to form a plait F', which laps over on the body fabric F, as shown in Fig. 23. Said plait forming member 20 is also adapted to form a reverse plait F², which laps over on the body fabric when the fabric is carried underneath the plait forming member as is also shown in Fig. 23.

As a means for supporting the plait forming member 20, I have provided a supporting rod 21. Said supporting rod 21 at its forward end carries a bearing block 22 in which is mounted a short shaft carrying a head 23, with an outwardly projecting lug 24, to which is secured the plait forming blade 20.

The shaft supporting the head 23 is loosely journaled in the bearing block 22. The supporting rod 21 extends through spaced bearings 25 and 26 formed in a bracket 27, which is secured to the head of the machine in any desired way. Said supporting rod 21 carries an upwardly projecting arm or standard 28, which is secured to the rod by means of a set screw 29. Said standard is provided at its upper end with a slot 30 (see Fig. 20), which slot receives a cross pin 31, connecting two spaced links 32 and 33. The links 32 and 33 are also connected to a stud or cross pin 34 carried by the lower end of an arm 35, rigidly secured to a shaft 36 mounted in bearings at the rear side of the machine, as shown in Fig. 3. A second arm 37 is rigidly secured to the shaft 36 and at its lower end carries a projecting bolt 38 which is located between the forked ends 38ª of an arm 39 pivoted at 40 to the standard of the machine.

A third arm 41 projects outwardly from the shank portion of the arm 39 and is connected to a treadle T by means of a rod or other connection 41ª. A spring T' holds the treadle as normally raised. It is understood that a knee shift may be used in place of this treadle, the essential feature being some operating means for the lever which is beneath the work support, whereby the same may be actuated and the operator's hands left free for the manipulation of the material being stitched. A spring 42 is coiled about a collar carried on the end of the shaft 36, and at one end bears against a lug 43, while at its other end said spring engages the arm 37 and normally holds the same pressed forward toward the forward end of the machine. This movement of the arm 37 will carry forward the arm 35, and its connection to the arm or standard mounted on the support for the plaiting blade. The arm or standard 28 is provided with a laterally projecting pin 44. Rigidly secured to the bracket 27, is an adjustable stop 45 against which the pin 44 is moved by the spring 42 operating through the rock shaft 36.

The stop 45 as herein shown is in the form of a rod which is carried by a cylinder 46 having a slot 47 formed in the side thereof. A screw 48 is threaded into the rod. The shank of the screw 48 engages one of the recesses 49. The recesses 49 are spaced along the cylinder 46 so that the rod or stop 45 may be adjusted in and out of the cylinder to vary the initial position of the support for the plaiting blade.

From the above description, it will be clear that by oscillating the shaft 36 through the treadle or knee shift, the arm 35 will be moved in the direction of the arrow, (Fig. 4) and through the link connection with the arm or standard 28 the support for the plaiting blade will be moved in its supporting bearings. Upon releasing the treadle or knee shift, the spring 42 will at once cause the arm 35 to move in a direction opposite to that indicated by the arrow until the standard or arm 28 engages the adjustable stop 45.

As shown in Fig. 20, the links carried by the arm 35 support a cross pin which runs in a slot 30 in the standard 28. A spring 50 is carried by the arm 35 and presses against the arm 28 and tends normally to hold the cross pin 31 at the right hand end of the slot 30. The spring 42 however, is of much greater tension than the spring 50, and therefore, when the pin 44 engages the adjustable stop 45, the arm 35 will continue its movements compressing the spring 50 and carrying the cross pin 31 to the left hand end of the slot 30. When the shaft 36 is first oscillated, the spring 50 will cause the standard to remain in contact with the adjustable stop so that there is no movement of the supporting rod for the plaiting member until the cross pin 31 engages the right hand end of the slot 30, after which the standard and the supporting rod will move with the oscillating arm 35, and the shaft 36.

The purpose of the lost motion above described is for tilting the plaiting member. The shaft which supports the plaiting member carries a slotted head 51 (see Fig. 13). A link 52, is provided with a flanged pin or screw 53, which engages the slot 54 formed in the head 51. The slot 54 extends equally above and below the axis of the shaft. The link 52 at its opposite end is pivoted at 55 to the lower end of the lever 56, which is fulcrumed at 57 on the standard or arm 28. Said lever 56 is provided with a substantially vertical slot 58 at it supper end, which engages an extension formed on the cross pin 31. It will readily be seen therefore, that when the shaft 36 is oscillated, the first movement of the cross pin 31 will oscillate the lever 56 and through the link 52, oscillate the shaft supporting the plaiting blade. If the link 52 is positioned as shown in Fig. 4, so that the flanged end 53 is at the upper end of the slot 54, the supporting shaft for the plaiting blade will be oscillated so as to move said blade at its forward end downward into contact with the material passing underneath the same.

As soon as the plait forming member has been oscillated into contact with the material through the lever 56, the cross pin 31 will reach the end of the slot 30, and now the supporting rod 21 will be moved forward carrying the plait forming member and the material forward so as to form a plait, holding the same until it has been secured by the stitching mechanism. If the plait forming blade is held at the forward end of its stroke, the feed of the fabric will merely convey the material underneath the plait forming blade, but only a single plait will be formed until it has been released by the operator so that it may be moved through the spring 42 to its rearward position. A forward movement again of the plait forming member will form a second fold in the fabric if desired. The plait forming member is entirely under the control of the operator and therefore, the folds may be formed at the will of the operator. If the link 52 is shifted to the lower end of the slot 54, then the oscillations of the supporting shaft for the plait forming member will be in the opposite direction, carrying the plait forming member upward and if the material is passed over the same, a reverse plait will be formed. As shown in Fig. 23, the plait forming member is oscillated in an upward direction forming the fold F', and then is oscillated in a downward direction so as to perform the reverse fold F².

As a means for readily shifting the link 52 so as to bring the flange connecting pin into one end or the other of the slot 54, I have provided a shifting plate 59, which is pivoted at 60 to a bracket 61 secured to the bed plate by a screw 62. An arm 63 extends rearward from the plate 59, and at its rear end rests on a lug 64 (see Figs. 10 and 12), carried by a bar 65, pivotally supported by arms 66 and 67, mounted at the ends of the bracket 27. The bar 65 extends substantially the length of the bracket and has a downwardly projecting curved rib 68, extending throughout its length. A lever 69 is fulcrumed at 70 (see Fig. 12) to the standard 28, and normally rests against the projecting rib 68 at one end, while the other end is forked at 71 to engage a ball 72 on the end of an arm carried by the link 52. A spring 73 (see Fig. 4) normally holds the shifting plate 59 raised and the rear end of the arm 63 lowered. This throws the lug 64 downward and through the rib 68, swings the lever 69 in a direction to raise the link 52. When the shifting plate 59 is depressed, the arm 63 is moved away from the lug 64, and the weight of the arm 52 throws the forward end of the same to the lower end of the slot 54. When the fabric passes underneath the plaiting blade 20, said fabric will ride over the shifting plate 69, and a downward pressure or pull upon the fabric will depress the plate 59 so that the link 52 will be thrown downward to the lower end of the slot 54, and consequently on the first movement of the operating mechanism, the plait forming member, will be thrown downward into contact with the material. As soon as the pressure is relieved on the plate 59, it is raised by the spring underneath the same so that the parts are normally set with the link 52, held at the upper end of the slot 54. The fabric is led in over the plait forming member 20 and an oscillation of the operating shaft 36 will cause the plait forming member to be raised into engagement with the under side of the fabric and move the same forward to form a fold.

I have provided a supporting member 74 which coöperates with the plait forming member 20 when said plait forming member engages the under face of the material. Said support 74 may also serve as a stripper. The supporting member 74 carries an edge guide 75 for guiding the edge of the material in which the plait is to be formed, when the same is passed over the plait forming member. The bracket 61 carries an edge guide 76 (see Fig. 2), for guiding the edge of the material when the same passes underneath the plait forming member.

My machine is more especially designed for use in forming the bottoms of boys' trousers in which an outer and an inner band is secured to the lower portion of the leg. As a means for forming and guiding the outer band, I have provided a folder 77. Said folder consists of an inner plate 78 and an outer folding plate 79 which extends about said inner plate. The folder is carried by the supporting member 74, which in turn is carried by an arm 79 pivoted at 80 to the head of the machine (see Figs. 2 and 5). Said arm 79 is provided with a segmental slot 81 which receives a pin 82 carried by the head of the machine. A spring 83 surrounds the pivot pin for the arm 79 and at one end engages a lug 84 carried by said arm 79, while the other end of the spring engages one arm of a lever 85. The lever 85 is pivoted to a stud 86 passing through a segmental slot in the arm 79. The lever 85 carries a projection 87 which engages a recess 87$^a$ in the arm 79 and holds the same locked in its lower position. By pressing on the lever 85, the projection is lifted from the recess in the arm and the spring 83 at once throws the folder together with the supporting member for the fabric, and the edge guide, to its raised position as shown in Fig. 5. When the folder is in its normal operative position, the outer band folded thereby will be fed to the presser foot so that the edge of the fold passes along one side of the auxiliary member 12 of the presser foot.

The lower folder 88 (see Figs. 2 and 15 to 19) is set in beneath the upper surface of the work support and is carried by a bracket arm 89, secured to the apron of the work support. Said folder comprises an inner member 90 and an outer member 91, for folding a strip about the inner member 90. The bracket 61 extends over the lower folder and the lower strip or band is carried underneath the bracket 61, and passes out from beneath the same at a point in advance of the stitching mechanism and in front of the presser foot.

The plaiting blade as clearly shown in Fig. 11$^a$, is provided with teeth 20$^a$ at the lower edge thereof and 20$^b$ at the upper edge thereof. When the blade is drawn down on the upper face of the fabric, the teeth 20$^a$ engage the fabric and when the blade is thrown up against the under face of the fabric, the teeth 20$^b$ engage the fabric.

In order that the ruffling blade may be yieldingly held against the fabric and returned to a normal position intermediate the guide for the fabric when passed over the blade, and the guide for the fabric when passed under the blade, I have provided a special construction of head for supporting said plaiting blade. As shown in Figs. 24 to 26 inclusive, the short shaft 23$^a$ carrying the head 23 is freely mounted in a sleeve 23$^b$ and held therein by a screw 23$^c$. The sleeve 23$^b$ is secured to the head 51 and is oscillated thereby through the link 52 in the manner above described. The shaft 23$^a$ has a socket 23$^d$ (see Fig. 25), which receives a ball 23$^e$ mounted in a recess in the supporting head 22 and held pressed into the socket by a spring 23$^f$ which is compressed by a screw 23$^g$. It will thus be seen that the shaft supporting the plaiting blade is yieldingly connected to the sleeve which is connected to the head for oscillating the blade. The ball operates to yieldingly maintain the plaiting blade in normal inoperative position.

In order to hold the plaiting blade in a position intermediate the fabric engaging positions of the blade, I have provided a spring 24$^a$ which is coiled about the shaft 23$^a$ and the ends thereof are arranged on opposite sides of a pin 24$^b$ carried by the sleeve and a pin 24$^c$ carried by the head supporting plaiting blade. It will readily be seen that if the pin is properly positioned, the blade will be returned to its normal position in substantially a horizontal plane and can be yieldingly moved in either direction by the movements of the head 51. In Fig. 27 I have shown a finger piece 52$^a$, for manipulating the link 52 so as to swing the plaiting blade.

In the operation of my device, the outer band is passed through the folder 77, while the inner band is passed through the folder 88. The body fabric is led between the two folded bands to the stitching mechanism. The edge of the fabric if passed below the plait forming member 20, is guided by the guiding plate 76, while said edge is guided if passed above the plait forming member 20 by the guiding plates 75 and 76. When it is desired to form a plait in the body fabric, the operator through the knee shift or treadle, oscillates the shaft 36 which through the arm 35 operates the plait forming member. If the link 52 is at the upper end of the slot 54, then the fabric should be passed over the plait forming member 20, and the first movement of the arm 35, will swing the lever 56, which will oscillate the plait forming member so as to throw the same upward against the fabric, carrying the fabric against the supporting plate 74 and a further movement of the arm 35 will move the plate forming member forward forming a fold in the fabric. When it is desired to form the reverse fold, the fabric is guided underneath the plait forming member 20 and drawn downward against the shifting plate 59, which through the guiding bar 65 and lever 69, will throw the link 52 downward to the lower end of the slot 54, thus causing the plait forming blade to move downward on to the fabric and as it is moved forward a reverse fold will be formed therein.

While I have shown my improved plaiting mechanism as used in connection with an upper and a lower folder, it will be obvious from certain aspects of the invention other forms of folders may be used, or in fact, said plait forming mechanism may be used by itself and without any folding members.

It will also be understood that I do not wish to be limited to the mechanism herein described for operating the plait forming member, as various changes may be made in the details of construction.

The essential features of my invention consist in a plait forming mechanism, which may be controlled at the will of the operator, for forming a single plait or a reverse plait whenever desired.

Having thus particularly described my invention, what I claim as new and desire to secure by Letters Patent, is:—

1. A plait forming machine including in combination, a work support, a feeding mechanism, a plait forming member, an actuating member, devices between said actuating member and said plait forming member, and manually actuated means located beneath the work support and connected to said actuating member for operating said plait forming member to form a plait.

2. A plait-forming member including in combination, feeding mechanism, a plait-forming member, manually operated means for causing said plait-forming member to form a single plait substantially at right angles to the line of feed, and means whereby said plait-forming member may be shifted so as to form reverse plaits.

3. A sewing machine including in combination, stitch forming mechanism, a work support, a feeding mechanism, a plait forming member, a lever for actuating said plait forming member, and manually actuated means located beneath the work support and connected to said lever for operating said plait forming member to form a plait without stopping the stitching mechanism.

4. A sewing machine including in combination, stitch forming mechanism, a feeding mechanism, a plait-forming member, a manually actuated means for actuating said plait-forming member without stopping the stitching mechanism, and means for shifting the position of the plait-forming member whereby reverse plaits may be made.

5. The combination with stitch forming mechanism, a work support, an upper folding device located above the work support, a plait forming member operable upon the fabric passing beneath said folding device, an actuating member, devices connecting said actuating member to said plait forming member, and manually operated means located beneath the work support and connected to said actuating member for operating the plait forming member to form a plait in the fabric beneath the folder at the will of the operator.

6. The combination with stitch forming mechanism, an upper folding member, a lower folding member, means for guiding a fabric between said folding members, a plait-forming member, and manually actuated means for causing said plait-forming member to engage either the upper or lower face of the fabric passing between said folding members.

7. The combination with stitch forming mechanism, an upper folding member, a lower folding member, means for guiding a fabric between said folding members, a plait-forming member adapted to engage the fabric passing between said folders, manually actuated means for actuating the plait-forming member, and means for shifting the plait-forming member whereby reverse plaits may be formed.

8. The combination with stitch forming mechanism, of a plait-forming blade normally out of engagement with the fabric, manually actuated means for moving said blade into engagement with the fabric, and for forming a plait in the fabric.

9. The combination with stitch forming mechanism, of a plait-forming blade normally out of engagement with the fabric, manually actuated means for moving the blade into engagement with the fabric and for forming a plait in the fabric, and means for shifting the position of the blade, whereby reverse plaits may be formed.

10. The combination with stitch forming mechanism, of a plait-forming blade normally out of contact with the fabric, manually actuated means for moving the blade back and forth, and manually operated means for moving said blade either up or down to cause the same to engage the fabric before it is moved forward to form a plait.

11. The combination with stitch forming mechanism, of a plait-forming member, a supporting rod to which said plait-forming member is pivoted, manually actuated means for reciprocating the rod, and manually operated means for oscillating the plait-forming member prior to the reciprocating movement of the rod.

12. The combination with a plait forming member, a supporting rod, a shaft carried by said supporting rod, and supporting said plait forming member, a slotted head carried by said shaft, a link connected to said slotted head, means whereby said link may be shifted from one end of the slot to the other, means for operating said link to oscillate the shaft carrying the plaiting member, and means under the control of the operator for operating said supporting rod, and said link.

13. The combination of a plait forming member, a supporting rod, a shaft carried by said rod and supporting said plait forming member, a standard carried by said supporting rod, a rock shaft, a link connected to said rock shaft, and having a loose connection with said standard, a slotted head carried by the shaft supporting the plait forming member, a second link pivoted to said first named link, and to said slotted head.

14. The combination of a plait forming member, a supporting rod, a shaft carried by said rod and supporting said plait forming member, a standard carried by said supporting rod, a rock shaft, a link connected to said rock shaft, and having a loose connection with said standard, a slotted head carried by the shaft supporting the plait forming member, a second link pivoted to said first named link and to said slotted head, and means under the control of the operator for shifting the link from one end of the slot in the head to the other end thereof.

15. The combination of a plait forming member, a supporting rod, a shaft carried by said supporting rod, and supporting said plait forming member, a slotted head carried by said shaft, the slot in said head extending above and below the axis of the shaft, a standard carried by said supporting rod, a rock shaft, a link pivoted to said rock shaft, a slot formed in said standard, a cross pin carried by said link and extending through said slot, a spring interposed between said rock shaft and said standard, a lever pivotally connected to said cross pin, a second link pivoted to said lever and having a flanged pin located in the slotted head of the supporting shaft for the plait forming member.

16. The combination of a plait forming member, a supporting rod, a shaft carried by said supporting rod, and supporting said plait forming member, a slotted head carried by said shaft, the slot in said head extending above and below the axis of the shaft, a standard carried by said supporting rod, a rock shaft, a link pivoted to said rock shaft, a slot formed in said standard, a cross pin carried by said link and extending through said slot, a spring interposed between said rock shaft and said standard, a lever pivotally connected to said cross pin, a second link pivoted to said lever, and having a flanged pin located in the slotted head of the supporting shaft for the plait forming member, and means under the control of the operator for shifting the position of the connection between the link and the slotted head.

17. The combination of a plait forming member, a support therefor, a shaft carried by said support and supporting said plait forming member, means for reciprocating said support, means for oscillating said shaft, and means for reversing the oscillations of said shaft including a plate located in the path of movement of the fabric.

18. The combination of a plait forming member, a support therefor, a shaft carried by said support and supporting said plait forming member, a slotted head carried by said shaft, a link connected to said slotted head for oscillating said shaft, and means for shifting the connection between said link and said slotted head, including a pivoted plate located in the path of movement of the fabric.

19. The combination of a plait forming member, a support therefor, a shaft carried by said support and supporting said plait forming member, a slotted head carried by said shaft, a link connected to said slotted head for oscillating said shaft, and means for shifting the connection between said link and said slotted head including a pivoted plate located in the path of movement of the fabric, and a spring for normally holding said plate raised and the link at one end of said slotted head.

20. The combination of a plait forming member, a supporting bracket, a rod sliding in said bracket, a shaft carried by said rod and supporting said plait forming member, a slotted head carried by said shaft, a link connected with said slotted head for oscillating the shaft, means for reciprocating said rod and said link, and means for shifting the position of the link from one end of the slot to the other, including a lever moving with said rod, a pivoted member having a rib engaging one end of said lever, and means under the control of the operator for shifting the position of said rib.

21. The combination of a plait forming member, a supporting bracket, a rod sliding in said bracket, a shaft carried by said rod and supporting said plait forming member, a slotted head carried by said shaft, a link connected with said slotted head for oscillating the shaft, means for reciprocating said rod and said link, and means for shifting the position of the link from one end of the slot to the other, including a lever moving with said rod, a pivoted member having a rib engaging one end of said lever, an arm projecting from said pivoted member, a pivoted plate having an arm adapted to engage said first named arm, said plate extending across the path of movement of the fabric, and a spring for normally holding said plate raised.

22. The combination of a work support, a plait forming member, an actuating member connected to said plait forming member, manually controlled means located beneath the work support and connected to said actuating member for actuating said plait forming member, and adjustable stops for limiting the backward movement of said plait forming member.

23. The combination of a plait forming member, a rock shaft connected to said plait forming member, said rock shaft being under the control of the operator, whereby said plait forming member may be moved forward, a spring operating through said rock shaft for returning said plait forming member to inoperative position, and an adjustable stop for determining the inoperative position of said plait forming member.

24. A plait forming member, a supporting rod therefor, a standard carried by said rod, means connected to said standard for reciprocating said rod, a pin carried by said standard, and an adjustable stop located in the path of movement of said pin.

25. A plait forming member, a supporting rod therefor, a standard carried by said rod, means connected to said standard for reciprocating said rod, a pin carried by said standard, an adjustable stop located in the path of movement of said pin, said adjustable stop comprising a rod, a slotted cylinder for receiving said rod, and a screw carried by said rod, and adapted to engage recesses formed in the slotted cylinder for holding the rod in adjusted positions.

26. In combination with stitch forming mechanism, a plait forming member normally held free of the fabric to be stitched and plaited, means under control of the operator to tilt said plait forming member at an angle both above and below a plane passing through said plait forming member when in normal position.

27. In a sewing machine, stitch forming mechanism, plait forming means including a plait forming blade, said blade being provided with a double row of teeth, one of which is disposed on the upper surface and the other on the lower surface of the plait forming blade.

28. The combination with stitch forming mechanism, a plait forming member, an upper folding device, a lower folding device, said folding devices having surfaces with which said plait forming member coöperates, one of said walls being pivoted to swing vertically and being provided with locking devices to maintain it in position.

29. The combination with stitch forming mechanism, a plait forming member, an upper folding device, said folding device being provided with a support with which said plait forming member coöperates, means for mounting said upper folding device, whereby the same may be swung upwardly away from the plait forming member, a locking device for holding the same in normal position, and devices for raising the same when released from the locking device.

30. In a sewing machine, stitch forming mechanism, means to form reversed plaits, an upper and a lower folding device and a guide for the fabric to be plaited interposed between the upper and lower folding devices.

31. In a sewing machine, stitch forming mechanism, means to form reversed plaits, an upper and lower folding device, and a guide for the fabric to be plaited, said guide being suspended from the said upper folding device.

32. In a sewing machine, stitch forming mechanism, a plaiting device including a double edge blade, means under control of the operator for actuating said plaiting device and automatic means for restoring said plaiting means to its initial position out of contact with the fabric whereby it can be moved to engage either surface of the fabric to be plaited.

33. In a sewing machine, stitch forming mechanism, a work plate having an opening therein, a plaiting device, means to operate said plaiting device, including a link extending across said opening and having formed therein an upwardly projecting offset.

34. In a sewing machine, stitch forming mechanism, a plait-forming member, means for supporting said plait-forming member, manually operated means for reciprocating the support for the plait-forming member, means for swinging said plait-forming member on its support, said plait-forming member being yieldingly held on its support, whereby the same will yieldingly engage the fabric.

35. In a sewing machine, stitch forming mechanism, plait forming means including a blade, a holder for said blade, said blade being yieldingly held on said holder whereby it can swing in the arc of a circle to yieldingly engage the fabric and means to return said blade to its initial position free of the material.

36. In a sewing machine, a plaiting device including a plaiting blade, manually operated means for actuating the plaiting blade, manual means for swinging said plaiting blade in one direction for engaging the fabric to form a plait, and automatic means for swinging it in the opposite direction, to engage the fabric to form a reverse plait.

37. A sewing machine including in combination, a plaiting device for forming reverse plaits, manually operated means for actuating said plaiting device to form the plaits, means for adjusting the throw of said manually operated means for varying the width of the plait, and means for changing the action of said manually operated means for reversing the plait.

38. In a sewing machine, a plait forming member, a tilting support therefor, a double actuating spring, said spring operating to hold said plaiting device against the fabric when operating either above or below its pivotal point.

39. In a sewing machine, a plaiting device, means under the control of the operator for actuating said plaiting device, and means located in the path of travel of the material to be plaited for changing at will the direction in which the formed plait will lie.

In testimony whereof I affix my signature, in presence of two witnesses.

JAMES R. MOFFATT.

Witnesses:
C. McNeil,
A. B. Clothier.

Copies of this patent may be obtained for five cents each, by addressing the "Commissioner of Patents, Washington, D. C."